Sept. 26, 1961  W. P. BYRNES  3,002,139
ELECTRICALLY POWERED BALANCE MECHANISM
Filed July 2, 1958  5 Sheets-Sheet 1

INVENTOR.
William P. Byrnes
BY
Atty.

United States Patent Office 3,002,139
Patented Sept. 26, 1961

3,002,139
ELECTRICALLY POWERED BALANCE
MECHANISM
William P. Byrnes, Glenview, Ill., assignor to General
Time Corporation, New York, N.Y., a corporation of
Delaware
Filed July 2, 1958, Ser. No. 746,196
6 Claims. (Cl. 318—132)

This invention relates in general to timing devices, and in particular to electrically powered balance mechanisms. While not limited in its applications, the invention finds especially advantageous use in small balances wherein a battery supplies energy to an oscillating rotor which, by its harmonic motion not only constitutes a precision timing element but may also drive utilization parts, such as the hands of a clock.

It is the general aim of the invention to provide an electrically powered oscillatory balance mechanism of the type requiring no switch contacts and in which signals are electromagnetically generated in response to movement of the balance rotor, then amplified and employed to create oscillation-sustaining torque pulses on the rotor, the whole being particularly characterized by its immunity in operation to extraneous forces which tend to increase or decrease the amplitude of balance motion.

An important object of the invention is to make such a balance mechanism relatively insensitive to changes in the magnitude of the source voltage, so that reliable operation continues even though the voltage of the battery decreases with age and usage.

A further object is to provide a highly efficient electrically powered balance mechanism in which a transistor is utilized as an amplifier, and in such manner as to preclude gradual, progressive decreases or increases in the amplitude and velocity of the balance rotor motion.

Other objects and advantages will become apparent as the following description proceeds, taken in conjunction with the accompanying drawings in which:

FIG. 8 is similar to FIG. 6 but illustrates the advantageous operation obtained from the balance mechanism embodying the present invention.

While the invention has been shown and will be described in some detail with reference to a particular embodiment thereof, there is no intention that it thus be limited to such detail. On the contrary, it is intended here to cover all modifications, alternative constructions and equivalents falling within the spirit and scope of the invention as defined by the appended claims.

Figure 1:
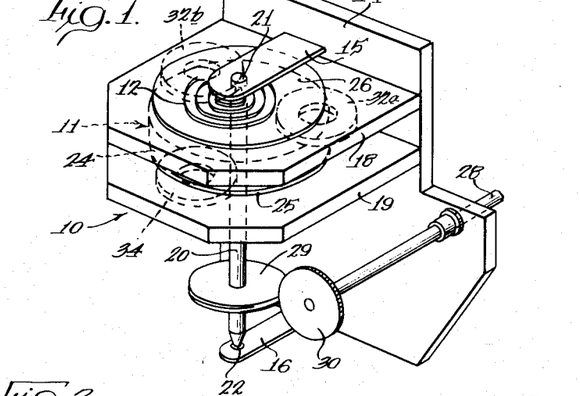
FIGURE 1 is a perspective view of a balance mechanism embodying the features of the invention.

Referring now to FIG. 1, the oscillatory balance mechanism there illustrated comprises, as its major components, a stator 10 journaling a rotor 11, with a hairspring 12 connected therebetween so that the rotor will have oscillatory, harmonic motion after being displaced from its "dead center" position. Such back and forth rotation results from successive conversions of energy from potential to kinetic form. With the rotor displaced to wind up the spring 12, the latter stores potential energy, thus forcing the rotor to rotate in the opposite direction so that such energy is converted into kinetic energy. After swinging through its "dead center" position, the rotor by virtue of its inertia continues its motion and thus winds the spring 12 in the opposite direction. One complete cycle of oscillation will occur in a substantially constant time period which is determined by the rotational inertia of the rotor 11 and the modulus of the spring 12. The oscillations will not, however, continue indefinitely since there are inevitable energy losses occasioned by friction, windage, hysteresis in the spring, and loading of the rotor by the mechanism which it drives. To make up for that energy loss, short torque pulses are applied to the rotor 11 in directions to sustain its oscillation by electromagnetic means to be described.

The term "dead center" position as used herein denotes the position in which the rotor 11 will eventually come to rest with the spring 12 unstressed. It is the position in which the rotor has its maximum velocity during each cycle of angular oscillation.

As here shown, the stator 10 includes a vertical support 14 from which upper and lower brackets 15, 16 extend. Vertically spaced, centrally apertured plates 18, 19 also project from the support 14 for the purpose of receiving and holding stationary electric windings, as explained below.

The rotor 11 includes a staff or shaft 20 having its opposite, tapered ends received and journaled in pivot bearings 21, 22 carried by the ends of the respective brackets 15, 16. Forming a flywheel is an annular permanent magnet 24 supported on a shield plate 25 which is fixed to the shaft 20 and extending transversely to the axis of the latter.

The permanent magnet flywheel in this instance is constructed to have a plurality of pairs of poles which are angularly spaced in a circle about the axis of the shaft 20. For this purpose, the permanent magnet 24 has six segmental areas, alternate ones of which are polarized in opposite senses in a direction parallel to the axis of the shaft 20. Three such pairs of polar areas are here shown, being labeled N1, S1; N2, S2; N3, S3. For a purpose to be made clear below, a shield plate 25 beneath the permanent magnet 24 is made of a highly permeable material, e.g., soft steel, over the 240° arc which underlies the polar areas N1, S1 and N2, S2. This shield 25, however, is cut out or formed of low permeability, paramagnetic material such as brass, over the 120° arc which underlies the two polar areas N3, S3. This portion of the shield 25 which does not form a shunting path for flux emanating from the underside of the permanent magnet 24 is represented, for convenience, by the hatching in FIGS. 3 and 4.

In order to provide a high permeability return path for magnetic flux emanating from the upper surface of the permanent magnet 24, an annular disk 26 made of highly permeable material, such as soft steel, is supported on the upper surface of the plate 18. Since the spiral hair-spring 12 is interconnected between the upper bracket 15 and the upper end of the shaft 20, the disk 26 is interposed between the permanent magnet 24 and the spring 12, thus also shielding the latter.

If the rotor 11, constituted in part by the permanent magnet 24, is set in motion, it will angularly oscillate back and forth due to successive conversions of energy from potential to kinetic form. Such oscillation of the rotor 11 and its shaft 20 is converted into unidirectional rotation of an output shaft 28 by means of a one-way plate cam drive escapement which includes a plate cam wheel 29 mounted on the shaft 20 and cooperatively engaged with a toothed wheel 30 disposed on the shaft 28. With each oscillation of the shaft 20, the shaft 28 is stepped one angular increment, and always in the same direction. This timed rotation of the shaft 28 may be utilized to drive the hands of a clock or any other mechanism requiring a precisely timed input.

Figure 3:
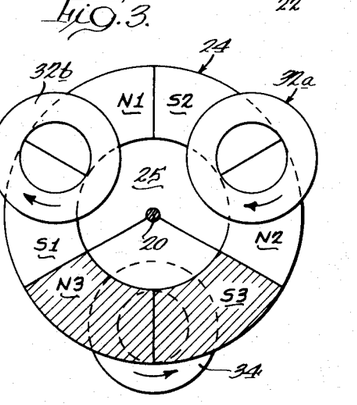
FIGS. 3 and 4 are stop-motion views showing the relative positions of windings and a cooperating permanent magnet rotor when the latter is in its dead center position and displaced therefrom by 270°, respectively.
Figure 4:
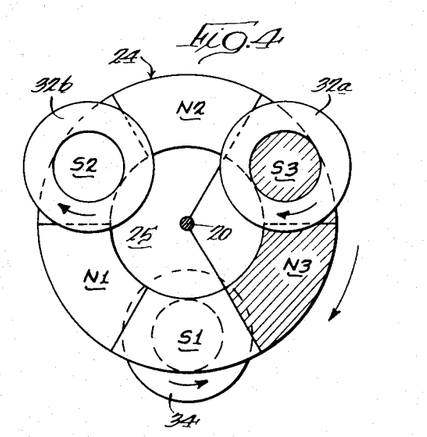

In order to overcome the inevitable friction, windage losses and loading, and thus to sustain the oscillations of the rotor 11, an electromagnetic drive coil 32 is carried by the plate 18 in closely spaced relation to the upper surface of the magnet 24. As here shown, the drive coil 32 is made up of two sections 32a and 32b which are spaced apart by the 120° on the plate 18 and electrically connected in series. As shown in FIG. 3, these drive winding sections 32a and 32b are angularly disposed such that the first is centered about the junction between the polar areas N1, S1, and the second is centered about the junction of the polar areas N2, S2, when the permanent magnet 24 is in its dead center position. With the parts so relatively disposed, and if current is supplied to the winding sections 32a, 32b in the directions illustrated by arrows in FIG. 3, then the electromagnetic field set up in these winding sections will coact with the permanent field from the polar areas of the magnet 24, creating torque on the latter which tends to move it in a clockwise direction. It will be seen that the electromagnetic field of the winding section 32a creates a repelling force on the polar area N2 and an attractive force on the polar area S2; while the electromagnetic field from the winding 32b creates a repelling force on the polar area N1 and an attracting force on the polar area S1.

In order to so phase the energization of the drive winding sections 32a and 32b such that they occur only when the rotor is substantially in its dead center position, the angular position of the permanent magnet is sensed by an electromagnetic pick-up coil, and the signal induced in that pick-up coil is amplified and utilized to create the properly timed energization of the drive winding sections.

As here shown, a pick-up winding 34 is carried by the plate 19 in closely spaced relation to the underside of the permanent magnet 24 and its segmental shield 25. The winding 34 is so disposed in the plate 19 that it is centered about the junction of the polar areas N3, S3 when the permanent magnet 24 is in its dead center position (FIG. 3). As the rotor 11 and its permanent magnet 24 rotate back and forth through a considerable angle, magnetic flux only from the polar areas N3, S3 will link with the pick-up coil 34. Magnetic flux emanating from the undersides of the polar areas N1, S1 and N2, S2 will not link to an appreciable degree with the pick-up winding 34 when those areas are passing over that winding, because the high permeability portion of the shield 25 will shunt that flux and confine it to the shield.

When the permanent magnet 24 is moving clockwise and passing through its dead center position, a relatively high amplitude voltage pulse of one polarity will be induced in the pick-up winding 34, while a similar pulse but of opposite polarity will be induced as the rotor passes through its dead center position while moving in a counterclockwise direction. Also, when the rotor is in motion and the permanent magnet 24 is passing through a position displaced by 60° on either side of dead center, only flux from one or the other of the polar areas N3, S3 will link with one side of the pick-up winding 34 and will thus induce a low amplitude voltage pulse in that winding, the polarity of such pulse depending upon the direction in which the rotor is moving.

Figure 2:
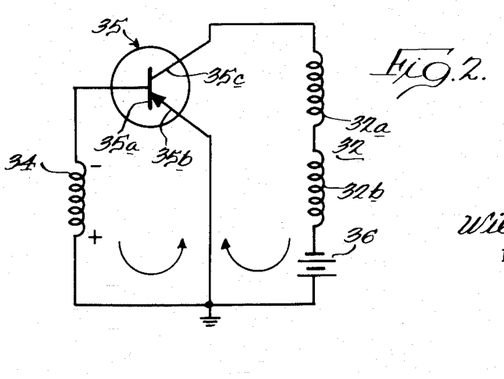
FIG. 2 is a schematic wiring diagram of the electrical components and connections for the mechanism shown in FIG. 1.

In order to utilize the voltages which are induced in the pick-up winding 34 so as to create properly timed pulses of exciting current to the drive winding 32, an amplifying discharge device or transistor 35 is employed, being connected in circuit with the windings and a voltage source or battery 36 as shown in FIG. 2. The transistor 35 has a base terminal 35a, an emitter terminal 35b, and a collector terminal 35c, and is here shown as a PNP junction transistor, for example type 2N406. When connected as here shown in a common emitter circuit, the input terminals for the transistor are constituted by the base 35a and the emitter 35b; the pick-up winding 34 is connected across these input terminals. The output terminals of the transistor 35 are formed by the emitter 35b and the collector 35c, the two sections of the drive winding 32 being connected in series with the battery 36 across these output terminals. When a negative voltage pulse (of the polarity shown in FIG. 2) is induced in the pick-up winding 34, input current will flow in the direction indicated from the emitter 35b to the base 35a, and this will so lower the impedance between the emitter 35b and the collector 35c that the battery 36c will cause a corresponding, amplified current to flow through the drive winding 32. On the other hand, when a positive voltage pulse is induced in the pick-up winding 34, the diode junction formed by the emitter 35b and the base 35a will substantially prevent any current flow, so that the impedance between the emitter 35b and the collector 35c will remain high and no current will flow from the battery 36 through the drive winding 32.

With the foregoing in mind, it will be understood that if the rotor 11 is once set in motion, it will oscillate back and forth under the influence of the spring 12. As the permanent magnet polar areas N3, S3 pass over the pick-up coil 34, negative voltage pulses will be induced in the pick-up winding at certain instants, and these voltage pulses will cause input current to the transistor 35, making the latter conduct drive current from the battery 36 through the drive winding 32. These current pulses to the drive winding will be so timed that they will always create torque on the permanent magnet in a direction to aid and sustain the oscillatory movement of the rotor. Such torque pulses will make up for energy losses and loading on the rotor, permitting the latter to continue its precisely timed motion indefinitely, that is, until the battery 36 is depleted and must be replaced.

In accordance with the present invention, the transistor 35 and the means connecting it to the pick-up and drive windings 34 and 32 are so related as to assure that the transistor is always driven to current saturation by negative voltage pulses which are induced in the pick-up winding 34. This results in the amplitude of current pulses supplied to the drive winding 32 being held substantially independent of the amplitude and velocity of the rotor motion. And as explained below, this avoids the progressive slow down or run-away action if the amplitude and velocity of the rotor motion should be slightly decreased or increased by an extraneous force.

Figure 5:
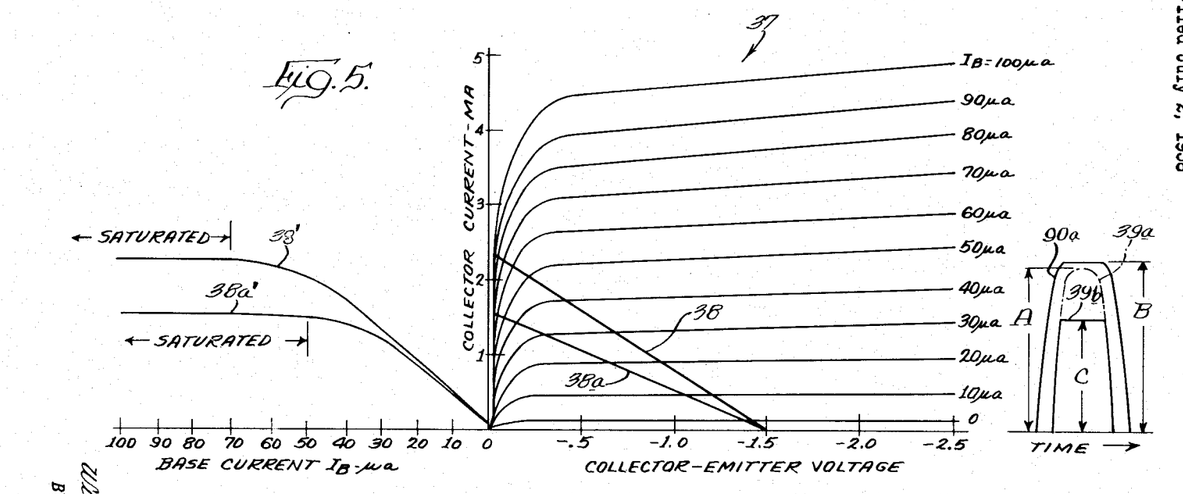
FIG. 5 is a graphic illustration of typical transistor current-voltage characteristics, load lines and transfer characteristics relating to input and output current.

For purposes of explanation, let it be assumed first that the transistor is not driven to current saturation by the current pulses which are induced in the pick-up winding 34. For example, let it be assumed that the transistor 35 has a family of collector current vs. collector voltage curves 37 for the parameters of emitter-base current values as shown in FIG. 5, and that the resistance of the drive winding 32 and the magnitude of voltage supplied by the battery 36 establish a load line 38. The transfer characteristic for the load line 38 is depicted by the curve 38′, showing the value of collector (output) current for any value of base (input) current. With the transistor and the drive windings operating on the load line 38 and transfer characteristic 38′, a relatively small current pulse 39 induced in the pick-up winding 34 will produce an output current pulse 39a through the drive winding which will have a maximum value A. If for any reason the amplitude of the current input pulse 39 which flows in the pick-up winding is increased or decreased, then the amplitude of drive current supplied to the drive windings will be correspondingly increased or decreased. And it will be apparent that the amplitude of the pick-up current pulse 39 is substantially proportional to the magnitude of the voltage induced in the pick-up winding, which in turn is directly proportional to the velocity of the rotor as it passes through its dead center position. In other words, if the amplitude of rotor oscillation is reduced, and the velocity of the rotor as it passes through dead center is reduced, the rate change of flux linkages will be reduced so that the voltage and current induced in the pick-up winding 34 will be lower.

Figure 6:
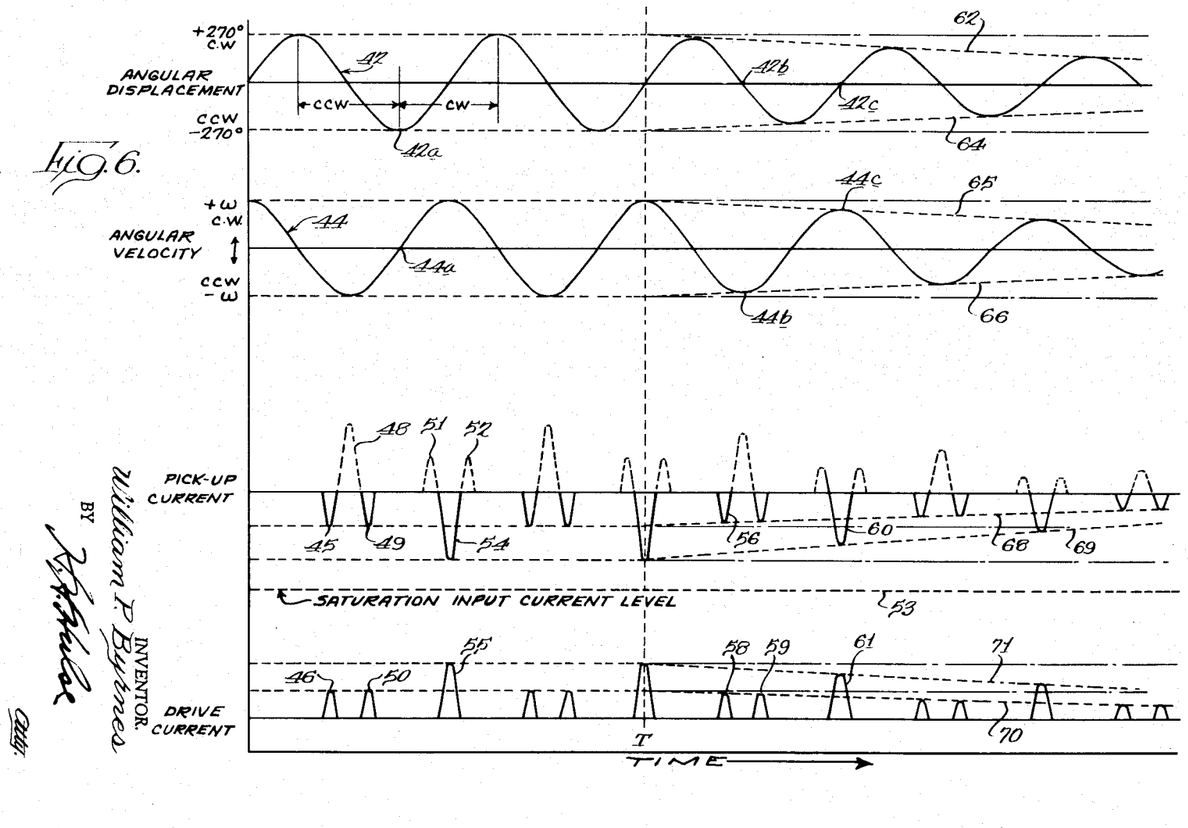
FIG. 6 is a graphic representation of rotor displacement, rotor velocity, pick-up current, drive current and torque, all plotted against a common time base, and illustrating the gradual progressive stoppage of the rotor under conditions which are avoided by the invention.

Referring to FIG. 6, let it be assumed that the rotor has a sinusoidal angular displacement with time as represented by the curve 42, swinging back and forth between angular positions displaced positively and negatively by 270° from dead center. The variation in angular velocity of the rotor with time is thus represented by the curve 44, having peak values ω. When the rotor passes through a point 60° on the clockwise side of its dead center position while moving in a counterclockwise direction, a negative voltage pulse will be induced in the pick-up winding 34, resulting in a small current pulse 45 flowing in the input circuit of the transistor. This in turn will permit the battery 36 to force a current pulse 46 through the drive winding 32, and will impart a torque pulse in a counterclockwise direction to the permanent magnet 24. As the rotor then passes through its dead center position, a relatively large positive voltage pulse 48 will be induced in the pick-up winding 34, but no current will flow in the input circuit of the transistor 35, and no current will flow through the drive winding 32. Then, as the rotor, still moving counterclockwise, passes through a position displaced 60° from dead center, another negative voltage pulse will be induced in the pick-up winding 34 resulting in an input current pulse 49 which releases a drive current pulse 50 through the drive winding 32.

As the rotor reaches the 270° limit of counterclockwise swing, its velocity will be reduced to zero, as indicated at points 42a and 44a, and the spring 12 will then cause a reversal of the rotor direction of movement. With the rotor now moving clockwise, as it passes through positions displaced 60° on either side of dead center, relatively low amplitude voltage pulses 51, 52 will be induced in the pick-up winding 34. Because these voltage pulses are positive in polarity, they will not produce corresponding pulses of drive current in the output circuit of the transistor 35. However, as the rotor passes through its dead center position while moving in a clockwise direction, it will induce a relatively large amplitude, negative voltage pulse in the pick-up winding 34. This will produce an input current pulse 54 creating a corresponding drive current pulse 55. The latter pulse is so timed as to make the electromagnetic field set up in the winding sections 32a, 32b impart clockwise torque to the magnet 24, thereby aiding and sustaining the rotor motion. It will be noted that neither the lower amplitude pick-up current pulses 45, 49 nor the higher amplitude current pulse 54 reaches or exceeds the input current saturation level, represented by the line 53 in FIG. 7, for the transistor.

This cycle of operation will repeat over and over so long as the rotor continues to have an oscillatory amplitude of 270°. The energy supplied to the rotor by the drive current pulses will just be sufficient to overcome friction, windage, hysteresis, and loading losses.

If now at the time instant T some extraneous force should act on the rotor 11 to slow it down and reduce its amplitude of oscillation slightly, serious consequences occur. Such a spurious loading or slowing of the rotor might occur, for example, if the ambient temperature dropped suddenly to increase the viscosity of lubrication in the balance and the mechanism which the output shaft 28 drives. This slight reduction in rotor amplitude would not immediately affect the timing or period of oscillation, but it would result in a lower maximum rotor velocity during each cycle of oscillation. Consequently, as the rotor approaches, in a counterclockwise direction, the dead center position represented by point 42b on curve 42, it will be approaching a maximum velocity represented at point 44b on curve 44. The maximum velocity at 44b is slightly less than the maximum velocity ω which the rotor achieved during normal operation prior to the time instant T. As a result of this, the negative voltage pulse induced in the pick-up winding 34 will have a lower amplitude, and the current pulse 56 supplied to the input circuit of the transistor 35 will have a lower amplitude than the earlier current pulses 45 and 49. Thus, the corresponding drive current pulse 58 supplied to the winding 32 will be of lower amplitude than the earlier pulses 46 and 50. The energy transferred to the rotor as it moves in a counterclockwise direction by the current pulse 58 and by the following current pulse 59 will be less than the energy which was transferred to the rotor by the earlier pulses 46 and 50. Under these circumstances, the rotor amplitude of oscillation will gradually be reduced, and correspondingly its maximum velocity during each cycle will also be reduced. By the time that the rotor passes through its dead center position while moving in a clockwise direction (point 42c on curve 46) its maximum velocity (point 44c on curve 44) will be still less than the earlier peak velocity ω. Therefore, the rate of change of flux in the pick-up winding 34 will be considerably reduced, and the resulting current pulse 60 which flows in the input circuit of the transistor 35 will have an amplitude which is considerably lower than the earlier current pulse 54. Accordingly, the resulting drive current pulse 61 passed by the transistor 35 from the battery 36 to the drive winding 32 will be considerably lower in amplitude than the earlier pulse 55, so that a smaller torque pulse will be imparted to the permanent magnet 24.

It will be seen from the foregoing that this will cause the rotor amplitude and peak velocity to further decrease. The above described action is therefore cumulative, and the amplitude of angular displacement will gradually decrease along lines indicated at 62 and 64 in FIG. 6. Also, the peak velocity of the rotor during each cycle of oscillation will gradually decrease along the lines indicated at 65 and 66 in FIG. 6. Since the magnitude of pick-up voltage is proportional to the velocity of the rotor in moving past the pick-up coil 34, the lower amplitude negative voltage pulses, and the corresponding input current pulses will gradually decrease in magnitude along the line indicated at 68 in FIG. 6, while the amplitude of the larger input current pulses will gradually decrease a long a line indicated at 69. Thus, the drive current pulses will also gradually decrease along the lines indicated at 70 and 71. As considerable time elapses, the rotor will move through a smaller and smaller amplitude until it finally completely stops.

Figure 7:
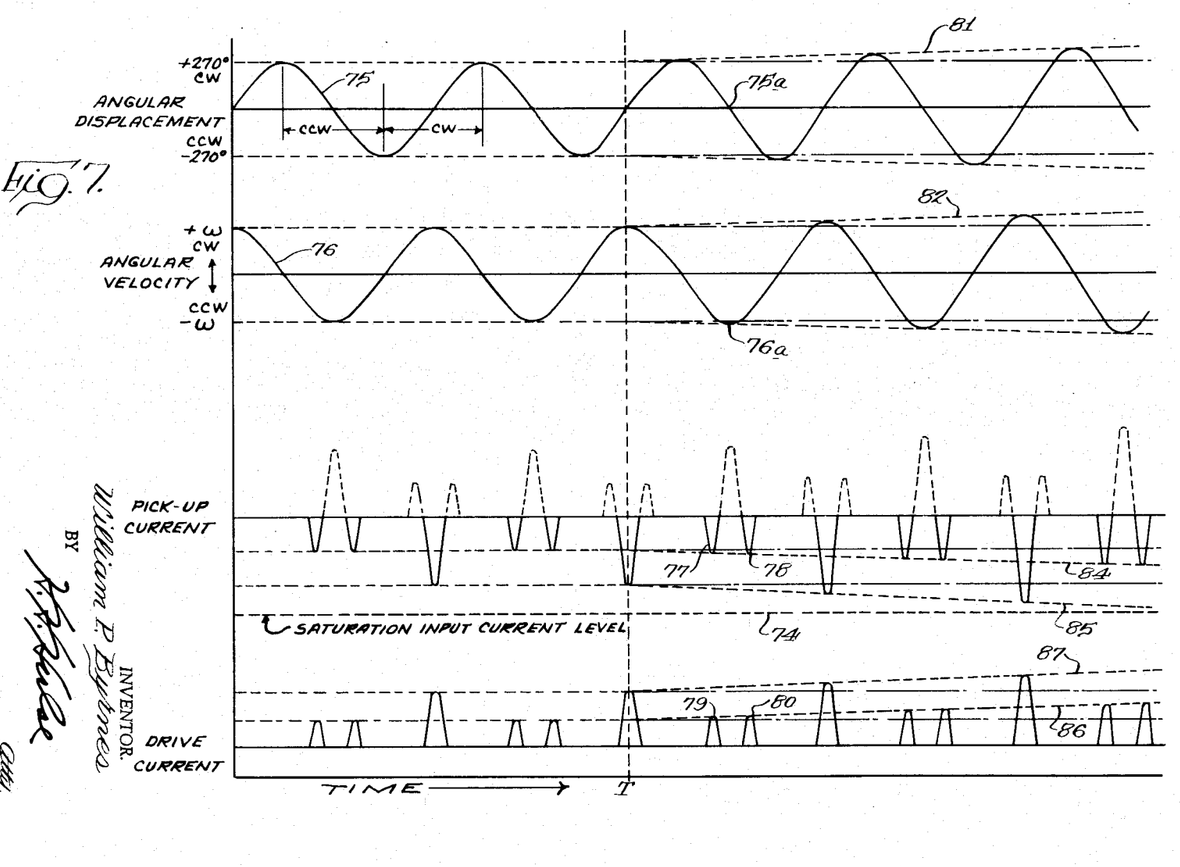
FIG. 7 is similar to FIG. 6 but illustrates the gradual "run away" of rotor amplitude and velocity under conditions which are avoided by the invention.

While FIG. 6 illustrates how the rotor can gradually and progressively come to a halt if something tends to initially reduce its amplitude of rotation by a slight amount when the transistor is not being driven to saturation, FIG. 7 illustrates the relationships of displacement, velocity, pick-up current and drive current which will cause the rotor to "run away" if for some reason the amplitude of oscillation is slightly increased when the transistor is not being driven to saturation by pick-up current pulses. Up to the time instant T shown in FIG. 7, the angular displacement curve 75, the rotor velocity curve 76, the pick-up current pulses and the drive current pulses are all substantially the same as illustrated in FIG. 6. The pick-up current pulses do not reach or exceed the input current saturation level 74 for the transistor 35.

If at the time instant T (FIG. 7) some extraneous, spurious force should reduce the loading on the rotor or give it an extra impulse to slightly increase its amplitude of motion, then the next time that the rotor passes through dead center (point 75a on curve 75) its peak velocity (point 76a on curve 76) will be slightly higher than the previous peak velocity ω. Accordingly, the current pulses 77 and 78 which are induced in the winding 34 just before and just after the rotor passes through this dead center position will be greater in magnitude than the preceding current pulses. Thus, the corresponding drive current pulses 79 and 80 will be of increased amplitude and will impart greater torque to the rotor. This will further increase the amplitude of oscillation and the peak velocity which occur during the succeeding cycle. And that, in turn, will increase the rate of change of flux sensed by the pick-up winding 34 as the rotor passes through its dead center position, thus further increasing the magnitude of pick-up current and the magnitude of drive current pulses. By the cumulative action described, therefore, the amplitude of rotor oscillation will gradually increase as illustrated by the line 81 in FIG. 7, while the peak amplitude of velocity will gradually increase as illustrated by the line 82. Also, the lower and higher amplitude input current pulses will be gradually increased in magnitude as indicated by the lines 84 and 85, while the drive current pulses will be correspondingly progressively increased in magnitude as indicated by the lines 86 and 87. As this cumulative action occurs, the rotor will be driven to greater and greater amplitudes of oscillation, overstressing the spring 12 so the latter cannot produce a precisely timed oscillation of the rotor. The amplitude of rotor motion will cease to increase when it becomes so great that the pick-up current pulses drive the transistor to saturation. But banking of the rotor may occur and accurate timing will have been destroyed.

In accordance with the invention, the foregoing difficulties are avoided by correlating the characteristics of the transistor, the number of turns in the pick-up winding 34, the resistance of the drive winding 32 and the magnitude of voltage supplied by the battery 36 so that the transistor is always driven to current saturation when the rotor has a predetermined, desired amplitude of motion, e.g., 270°. Referring to FIG. 5, if the transistor is made to operate along the load line 38 and the transfer characteristic 38', then the magnitude of the smallest input current pulse induced in the pick-up winding 34 is made to be great enough so that it exceeds the input current value necessary to drive the emitter-collector voltage substantially to zero. The input winding 38 is given a number of turns such that the smallest induced input current pulse 90 (FIG. 5) exceeds that value which is required to create output current flow having the value B. As the input current pulse 90, therefore, reaches a value which is less than its peak value, the corresponding output current pulse 90a reaches a maximum value and cannot increase further. Moreover, if the peak amplitude of the pulse 90 should decrease slightly, the corresponding peak amplitude B of the collector current pulse 90a will be unaffected. As a matter of preferred practice, the pulse 90 is made to exceed the saturation value, here shown as 70 microamperes, for the load line 8, by about 20 percent.

This operation is more clearly illustrated in FIG. 8 where the curves 91 and 92 represent the variations in rotor displacement and velocity with time. The input current pulses are shown at 94, while the drive current pulses are shown at 95. It will be observed that all of the input current pulses 94 exceed that value represented by the line 96 which is necessary to cause current saturation in the transistor 35. As a result, all of the drive current pulses 95 have the same amplitude.

If at the time instant T some extraneous force should impose additional drag on the rotor, causing the amplitude of the latter to decrease by the slight amount 100 shown in FIG. 8, then the peak velocity would also be decreased by a slight amount 101. Then, the amplitude of current pulses 102 and 103 induced in the pick-up winding 34 and supplied to the input of the transistor 35 would be correspondingly reduced relative to the amplitude of the preceding current pulses. However, the input current pulses 102, 103 still exceed the saturation current level represented by the line 96, so that the corresponding drive current pulses 104 and 105 would have the same amplitude as all of the preceding drive current pulses. Thus, the rotor would simply continue to oscillate with its same periodic frequency, and would have a slightly lower amplitude of angular oscillation, but without a progressive and cumulative slow down. When the spurious slowing influence is removed, the rotor will be restored to its original amplitude of oscillation.

It will be apparent that the same immunity to "run away" action is present. If for any reason the amplitude and peak velocity of the rotor should be increased, and the amplitude of input pulses induced in the pick-up winding 34 correspondingly increased, the amplitude of the corresponding drive current pulses would nevertheless remain the same. Thus, the rotor would then oscillate with a slightly greater amplitude but it could not "run away" due to progressive cumulative action.

If making input current pulses have the amplitude of the pulse 90 (FIG. 5) in normal operation is not convenient, the same immunity to cumulative "slow down" or "run away" may be obtained. If normal input current pulses have the amplitude of the pulse 39 (FIG. 5) then the drive winding 32 may be made with more resistance, producing an operating load line 38a. This in turn creates a transfer characteristics 38a', so that the input current pulse 39 results in an output current pulse 39b. It will be apparent that even though the input pulse 39 is decreased or increased in amplitude somewhat, the transistor 35 will always saturate, so that the amplitude C of the output current pulse 39b will remain substantially constant.

In actual practice it has been observed that the output current pulses are not truly flat-topped (as illustrated in FIGS. 5 and 8), and that the load lines 38 and 38a (FIG. 5) cannot be considered as straight lines. This is due to the fact that the drive winding 32 is not a pure resistance, but on the contrary possesses appreciable inductance. Also, the drive winding has a counter electromotive force induced therein at the time that the transistor and battery are supplying an output current pulse thereto. Such counter electromotive force, produced in a manner similar to that in an electric motor, bucks the battery voltage and causes the output current pulses to be depressed slightly in their midportions, rather than flat-topped. Nevertheless, the foregoing description based on the simplifying assumption that the load lines are straight and that output current pulses are flat-topped will adequately serve to illustrate the organization and operation of a balance mechanism embodying the invention.

It will be understood that several factors enter into the organization of the electrical circuitry in determining whether or not the transistor 35 will be saturated by each input current pulse induced in the pick-up winding 34 when the rotor 11 is oscillating with the desired angular amplitude. The permanent magnet strength for the polar areas N3, S3 in part determines the magnitude of pick-up voltage for a given velocity of the rotor. Likewise, the number of turns and the resistance of the pick-up winding 34 determine the magnitude of pick-up current and voltage for a given permanent magnet strength and a given velocity of rotor movement. The load line on which the transistor circuit operates will in part determine the magnitude of input current necessary to drive the transistor beyond current saturation. The slope of this load line is determined by the resistance (and to some extent by the inductance) of the drive winding 32, while its original or lowest point on the collector voltage axis is determined by the magnitude of voltage supplied by the battery 36. Also, the current amplification factor, $\beta$, for the particular transistor which is used, will in part determine whether or not an input current of a given amplitude drives the transistor beyond saturation.

These various factors can be readily correlated for a particular organization by one skilled in the art in order to make certain that the transistor always saturates in the manner above-described. And with the circuit constants so proportioned as to produce the saturating action for each input current pulse, the balance mechanism can be operated over long periods of time with full assurance that its timing precision will not be disturbed by slight extraneous forces. Experiments have shown that if this saturating operation is not provided, then sooner or later some extraneous force will occur which will either slightly speed up or slow down the rotor, producing the cumulative progressive action causing it either to run away or completely stop. That difficulty has been here solved.

I claim as my invention:

1. An electrically powered balance mechanism comprising, in combination, a stator part and a rotor part mounted for rotation relative thereto, a spring interconnected between said parts to make them have oscillatory relative rotation, a permanent magnet on one of said parts, a drive winding and a pick-up winding, means for mounting said windings on the other of said parts closely adjacent the poles of said magnet and for precluding substantial inductive coupling between said windings, a controlled amplifying discharge device connected to receive input signals induced in said pick-up winding as said magnet moves thereby, and means connecting said discharge device to supply current pulses to said drive winding in response to said input signals, said last-named means including means for causing said discharge device to be driven beyond current saturation by said input signals when said parts are oscillating through a predetermined angular amplitude.

2. An electrically powered balance mechanism comprising, in combination, a rotor part and a stator part, means for mounting said parts for rotation relative to one another, a spring connected between said parts to limit rotation and create oscillatory harmonic motion, a permanent magnet on one of said parts, a drive winding and a pick-up winding on the other of said parts, said pick-up and drive windings being spaced to preclude substantial inductive coupling therebetween and being closely spaced to the poles of said magnet, a transistor having input and output terminals, means connecting said pick-up winding to said input terminals, a battery and means connecting the latter in series with said drive winding to said output terminals, said windings being relatively positioned to make the signal induced in said pick-up winding by said permanent magnet render said transistor conductive between its output terminals at instants when current flow through said drive winding creates torque forces sustaining the relative motion of said parts, and means including said battery, drive winding, and pick-up winding for causing said transistor to be driven beyond current saturation in response to input signals induced in said pick-up winding when the parts are oscillating with a predetermined, desired amplitude.

3. An electrically powered balance mechanism comprising, in combination, a stator, a rotor journaled for rotation on said stator, a hairspring connected between said rotor and stator, a permanent magnet carried by said rotor, a pick-up winding carried by said stator and positioned to have voltages electromagnetically induced therein upon rotation of said magnet, a drive winding carried by said stator and positioned to electromagnetically exert torque on said rotor when energized by current coincident in time with said voltages, said pick-up and drive windings being mounted relative to each other to preclude substantial inductive coupling therebetween, a transistor having emitter, base and collector terminals, means for connecting said pick-up winding across said emitter and base terminals, a battery, means connecting said battery and drive winding in series across said emitter and collector terminals, said drive winding having a resistance and said battery providing a voltage which together cause the emitter-collector path in said transistor to be driven beyond current saturation in response to the amplitude of current flow through the emitter-base path in said transistor caused by said voltages when the rotor oscillates with a predetermined, desired angular amplitude.

4. An electrically powered balance mechanism comprising, in combination, a rotor journaled for rotation, a hairspring connected to said rotor for causing the latter to have oscillatory harmonic angular motion, a permanent magnet forming a part of said rotor and having a plurality of segmental areas successive ones of which are oppositely polarized in a direction parallel to the axis of rotor rotation, a stationary pick-up coil disposed on one side of said magnet to have voltage pulses of a predetermined polarity induced therein as said rotor moves in one angular direction through its dead center position, a stationary drive winding disposed on the opposite side of said permanent magnet for imparting oscillation-sustaining torque pulses to said rotor in response to current excitation applied to that winding in timed coincidence to said voltage pulses, said pick-up and drive windings being mounted to preclude substantial inductive coupling therebetween, a transistor having a base, emitter and collector, means connecting said pick-up winding across said emitter and base so that said voltage pulses produce current flow from the former to the latter, a battery and means connecting it in series with said drive winding across said emitter and collector, said input winding having a number of turns correlated with the field strength of said permanent magnet, the maximum velocity of the rotor when it has an oscillatory amplitude of approximately 270°, the input resistance of said transistor, the voltage of said battery and the resistance of said drive winding such that said emitter-base current flow exceeds by approximately 20 percent the saturation input current value for said transistor, whereby the rotor oscillates with immunity to spurious influences which tend to increase or decrease its amplitude of motion.

5. In an electrically powered balance mechanism having a stator part and a rotor part journaled for rotation, a spring connected between said parts to impart relative oscillatory motion thereto, a permanent magnet on one of said parts, a pick-up winding and a drive winding on the other of said parts, said pickup and drive windings being mounted to preclude substantial inductive coupling therebetween and being closely spaced to and inductively associated with said permanent magnet, and a direct voltage source; that improvement which comprises a transistor having input terminals connected to said pick-up winding and output terminals connected to said drive winding and battery in series, said transistor being correlated to the resistance of said drive winding and the voltage of said battery so that it is driven beyond current saturation by current induced in said pick-up winding when the rotor oscillates with a predetermined desired amplitude.

6. In an oscillatory balance having a rotatable permanent magnet associated with a hairspring to angularly oscillate with a substantially constant period, a pick-up winding closely spaced from and inductively coupled with said permanent magnet so that voltages are induced in the pick-up winding when the magnet is passing through substantially its dead center position, a drive winding closely spaced from and inductively coupled with said permanent magnet so that current supplied to that winding imparts a proportional torque pulse to the permanent magnet when the latter is passing substantially through its dead center position, and a battery; that improvement which comprises a transistor having a base emitter, and collector, means connecting the pick-up winding across said base and emitter, means connecting said drive winding and battery in series across said emitter and collector, means interposed between said windings for mounting the latter to preclude substantial inductive coupling there between, said battery, drive winding, pick-up winding and transistor being constructed and arranged to drive the latter beyond current saturation in response to the voltages induced in said pick-up winding when said magnet has an oscillatory motion of approximately 270° amplitude.

References Cited in the file of this patent

UNITED STATES PATENTS

| | | |
|---|---|---|
| 2,829,324 | Sargeant | Apr. 1, 1958 |
| 2,843,742 | Cluwen | July 15, 1958 |

FOREIGN PATENTS

| | | |
|---|---|---|
| 1,006,640 | France | Jan. 30, 1952 |
| 1,090,564 | France | Oct. 20, 1954 |
| 1,092,411 | France | Nov. 10, 1954 |